July 16, 1968   P. R. GOUDY ET AL   3,393,350
WIRING TROUGH AND COVER MOUNTING MEANS THEREFOR
Filed July 2, 1962
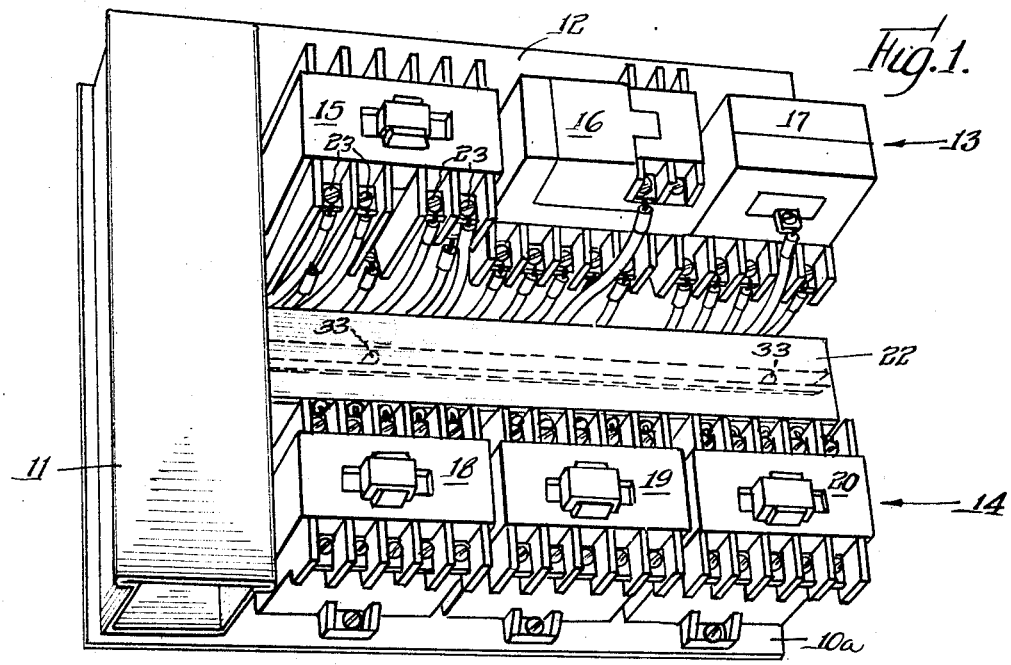
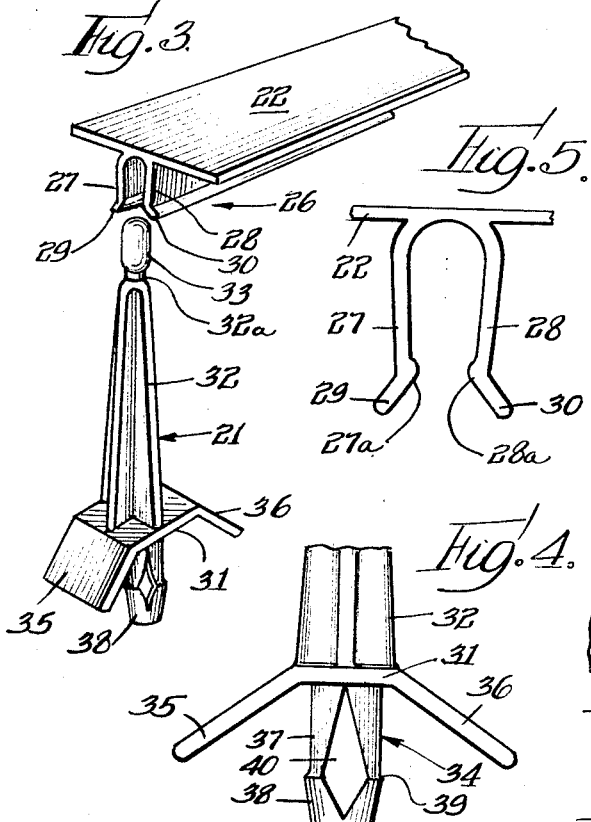
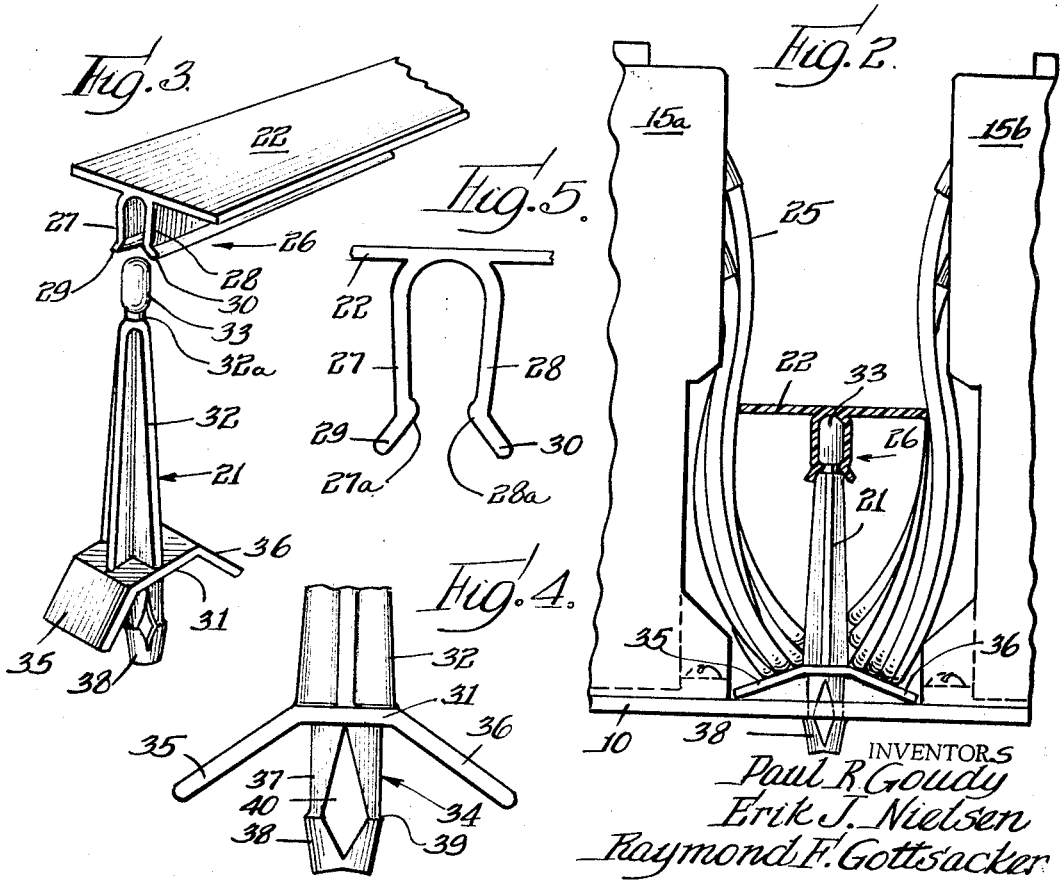
INVENTORS
Paul R. Goudy
Erik J. Nielsen
Raymond F. Gottsacker
BY: Paul J. Rose   Atty.

United States Patent Office 3,393,350
Patented July 16, 1968

3,393,350
WIRING TROUGH AND COVER MOUNTING
MEANS THEREFOR
Paul R. Goudy, Chagrin Falls, Ohio, and Erik J. Nielsen, Mequon, and Raymond F. Gottsacker, Milwaukee, Wis., assignors to Square D Company, Park Ridge, Ill., a corporation of Michigan
Filed July 2, 1962, Ser. No. 206,712
11 Claims. (Cl. 317—119)

This invention relates generally to an electrical control panel, and more particularly to a wiring duct for such a panel defined by the surface of the panel, the side walls of control devices mounted on the panel in spaced rows, and a cover mounted between the rows in spaced relation to the surface of the panel.

Formerly, electrical control devices were most often mounted on the front of a panel and the wiring for the devices was carried on the rear of the panel. More recently, it has been found desirable to mount the wiring for the devices on the front of the panel. Heretofore wiring on the front of the panel has been contained in separate wiring ducts mounted on the panel between rows of electrical control devices. While progress has been made in reducing the size of electrical control devices, proportional reduction in the size of the control panels has not been obtained because of the space required by the separate wiring ducts.

In accordance with the present invention, troughs for the wiring are provided and defined by the panel and by side walls of electrical control devices mounted thereon in spaced rows and abutting each other in the separate rows. The space between two adjacent rows of control devices provides a convenient trough for the wires and a cover is provided together with mounting posts that make it easy to cover the wires after they are placed in the trough and thus define a closed wiring duct.

An object of this invention is to provide a control panel wherein a wiring trough is formed by a mounting panel and two spaced parallel rows of electrical control devices mounted on the mounting panel.

Another object of the invention is to provide a control panel having mounted thereon a plurality of multipole electromagnetic control relays which are modular in form and which have all terminals, including the coil terminals, adjacent their respective fronts or tops, whereby two spaced rows of abutting relays on a mounting panel may form a wiring duct having no sharp metal edges to abrade insulation on wires, the mounting screws of the relays being shielded by portions of the relay casings.

Still another object is to provide a control panel wherein a wiring trough is formed by a panel and by the side walls of electrical control devices mounted thereon in spaced parallel rows and a cover for the trough is mounted on the panel, the terminals of the electrical control devices being located outside of the trough on the opposite side of the cover from the panel, for convenient testing and servicing.

A further object is to provide an improved control panel wherein a wiring trough is formed by a panel and the side walls of control devices mounted in rows on the panel and wherein a cover for the trough is detachably mounted on posts extending outwardly from the panel at spaced locations along the trough.

Still another object is to provide supporting posts for a wiring duct cover, the posts being readily mountable by a snap-in type connection with a panel and being able to be accommodated on panels of different thicknesses.

A still further object is to provide a wiring trough cover readily mountable by a snap-on type connection with supporting posts and able to be accommodated on supporting posts spaced different distances apart without modification of the cover.

Other objects will appear when the following specification is considered along with the accompanying drawings wherein:

FIGURE 1 is a perspective view of a portion of a control panel constructed and arranged in accordance with this invention and showing portions of two rows of control devices forming a wiring trough therebetween and a cover for the trough;

FIGURE 2 is a fragmentary end view in elevation showing portions of control devices in adjacent rows, the wiring trough cover in section, and one of the supporting posts therefor in elevation;

FIGURE 3 is a perspective view of a supporting post and a portion of the wiring trough cover;

FIGURE 4 is an enlarged elevational view of the lower portion of a supporting post; and FIGURE 5 is a fragmentary enlarged end view of the wiring trough cover.

The control panel of FIGURE 1 may be complete or it may be part of a larger panel. A mounting panel 10a has conventional wiring ducts 11 and 12 adjacent two respective edge portions. Extending at right angles to the duct 11 and parallel to the duct 12 are two rows 13 and 14 of electrical control devices, the row 13 containing, for example, an eight-pole relay 15, a four-pole relay and timer combination 16, and a four-pole relay and memory latch combination 17, and the row 14 containing, for example, three four-pole relays 18, 19, and 20. The relays are preferably of the type disclosed in copending application Ser. No. 206,624, filed on July 2, 1962, now Patent No. 3,215,800 and assigned to the assignee of the present invention.

In accordance with this invention, a plurality of spaced supporting posts 21 (FIGURES 2 and 3) formed of insulating material and each having a formed upper end 33 are mounted on the mounting panel 10a and support a wiring trough cover 22 formed of insulating material between the two rows 13 and 14 of electrical control devices, the panel 10a forming the bottom of the trough and the sides of the electrical control devices 15 through 20 adjacent the cover 22 forming the sides of the trough. The wiring trough covers such as the cover 22 may be made in different lengths and widths for use with different length rows of control devices spaced different distances apart.

FIGURE 2 shows an end view of two rows of electrical control devices including a pair of eight-pole relays 15a and 15b mounted on a mounting panel 10. Adjacent sides of the relays 15a and 15b and other relays in the respective rows form the sides of a wiring trough having a bottom formed by a surface of the mounting panel 10. A plurality of supporting posts 21 (only one of which appears in FIGURE 2) secured to the mounting panel 10 supports a wiring trough cover 22. A plurality of insulated wires 25 extend from terminals of the relays 15a and 15b into the wiring trough and then to other terminals which are not shown. The terminals of the relays 15a and 15b are not clearly shown in FIGURE 2, but similar terminals such as terminals 23 are apparent in FIGURE 1. The terminals of the electrical control devices and the exposed ends of the insulated wires 25 preferably are above or in front of the wiring trough cover 22. The jumbled central portions of the wires 25 are thus covered by the cover 22, while their ends at the terminals of the control devices are readily accessible.

As best shown in FIGURE 3, the cover 22 has a central longitudinally extending socket 26 depending from the underside thereof and extending parallel thereto and formed by a pair of flanges 27 and 28 having outwardly flared ends 29 and 30, respectively. The socket 26 preferably is coextensive lengthwise with the cover 22, but it may be segmented if desired. Each post 21 is preferably formed in one piece and includes a base portion 31 from which a ribbed column 32 extends upwardly to a formed upper end 33 adapted to be received firmly in the continuous socket 26 of the cover 22. The posts such as posts 21 may be made in different lengths, if desired, to space covers such as the cover 22 different distances from a panel.

The posts 21 are adapted to be plugged into holes in the mounting panel 10. For this purpose, the base 31 is provided with a generally cylindrical depending plug 34 and flexible angular extensions 35 and 36. The plug 34 has a cylindrical portion 37 having an inverted generally frusto-conical portion 38 joined integrally to its lower end, portion 38 being larger than the portion 37 adjacent the juncture to provide a retaining shoulder 39. A roughly diamond-shaped aperture 40 is provided in the plug 34 so that the two opposed portions thereof on opposite sides of the aperture 40 may be resiliently deformed by flexing inwardly.

When the plug 34 is inserted into a hole in the mounting panel 10 of a diameter substantially equal to the diameter of the portion 37, the portions on opposite sides of the aperture 40 will be flexed toward each other due to the taper of the frusto-conical portion 38 and will flex outwardly again as the frusto-conical portion 38 passes through the mounting panel 10 to engage the retaining shoulder 39 with the underside of the mounting panel. The angular extensions 35 and 36 of the base 31 will flex upwardly to accommodate mounting panels of various thicknesses, and will tend to flex downwardly again to their original positions so as to maintain the retaining shoulder 39 firmly in engagement with the underside of a mounting panel. The extensions 35 and 36 have considerable width, so that a post 21 may be firmly supported on a mounting panel 10 against rocking in any direction.

The upper end 33 of each post 21, rather than being completely spherical, is formed with generally cylindrical sides, so that the cover 22 is supported against tipping. The flanges 27 and 28 of the continuous socket 26 may be tapered downwardly inwardly so as to firmly clamp the ends 33 of the posts 21, the outwardly flared ends 29 and 30 aiding in spreading the flanges 27 and 28 apart during insertion of the ends 33. The flanges 27 and 28 are provided with inwardly extending projections or ribs 27a and 28a, respectively (FIGURE 5), which act as a detent in engaging a reduced diameter neck portion 32a of the post 21.

It will be seen that we have provided a firmly supported cover for a wiring trough formed by the mounting panel 10 and adjacent sides of the rows of electrical control devices such as the relays 15a and 15b, and that the terminals of the relays are above or in front of the cover for ready access, there being no sharp metal edges in the trough engageable by the wires. It will further be seen that the mounting posts 21 will accommodate different thicknesses of mounting panels and that they may be readily and firmly secured in position without the aid of separate nuts, retaining washers, clips, or pins. It will also be seen that the position of the mounting or supporting posts 21 along the longitudinal axis of the cover 22 is immaterial, so long as they are between the ends of the cover, because of the continuous longitudinal socket 26.

Various modifications may be made in the structure disclosed without departing from the spirit and scope of the invention as expressed in the appended claims.

We claim:

1. A wiring duct for an electrical control panel, said duct comprising a mounting panel, a supporting post mounted on said mounting panel and having an outer end portion spaced from the panel, and an elongated cover mounted on said formed outer end portion, said cover having an elongated socket formed integrally therewith on an inner side thereof and extending longitudinally and generally centrally thereof, said socket being adapted to receive said outer end portion of said post in a direction perpendicular to said cover at various locations spaced along said socket longitudinally of said cover.

2. A wiring duct as claimed in claim 1, wherein said socket is formed by two spaced flanges whose free end portions are resiliently forced apart by said formed outer end portion of said post during insertion thereover, whereby said formed outer end portion is resiliently clamped by said flanges.

3. A wiring duct as claimed in claim 2, wherein said free end portions of said flanges are flared outwardly on the inner sides thereof to facilitate reception of said formed outer end portion of said post in said socket.

4. A wiring duct as claimed in claim 2, wherein said flanges are respectively provided with inwardly projecting portions adjacent their free ends and said post is provided with a reduced diameter neck portion adjacent said formed outer end portion for receiving said projecting portions of said flanges.

5. A wiring duct as claimed in claim 1, wherein said post is provided with a base portion having a pair of opposed resiliently flexible projections extending angularly outwardly from said post and toward said mounting panel into engagement with the outer side thereof, said base portion having an inwardly extending plug with an outwardly facing retaining shoulder, said plug being received in a hole in said mounting panel, and said retaining shoulder engaging the inner side of said mounting panel adjacent said hole.

6. A wiring duct as claimed in claim 5, wherein said plug is provided with a transverse aperture affording resilient collapsing of said plug during insertion thereof through said hole.

7. A wiring duct as claimed in claim 1, wherein said formed outer end portion of said post includes a cylindrical portion extending axially of said post and tending to prevent rocking of said cover.

8. An electrical control panel comprising a mounting panel, two parallel spaced rows of electrical control devices mounted on said mounting panel and defining a wiring trough therewith, a pair of supporting posts mounted on said mounting panel generally centrally between said rows of electrical control devices and spaced longitudinally therealong, said posts having formed outer end portions, and an elongated wiring trough cover mounted on said outer end portions of said posts and having an elongated socket formed integrally therewith on an inner side thereof and extending longitudinally and generally centrally thereof, said socket being adapted to receive said formed outer end portions of said posts in a direction perpendicular to said cover and at various locations spaced along said socket longitudinally of said cover, and said outer end portions being received in said socket.

9. An electrical control panel as claimed in claim 8, wherein each of said electrical control devices is provided with a plurality of terminals all of which are disposed outside said trough in front of said cover for ready access without removal of said cover.

10. An electrical panel comprising, a panel board, a plurality of electrical devices mounted in rows on said panel board, the rows of electrical devices being in spaced relation to provide a wireway channel for receiving and containing electrical wires connected to said electrical devices, support means having one end carried by said panel board and the other end formed in shape of a locking wedge, said support means having a lateral dimension in the wireway channel substantially less than the width of the space between the rows of electrical devices so as to permit electrical wires connected to the devices to extend longitudinally through the wireway channel, and resilient cover means carried by said support means in spaced, substantially parallel relation to said panel board and having a channel portion rigidly gripping the wedge-shaped end of said support means to removably cover the wireway channel between said rows of electrical devices.

11. A structure for covering long, narrow passageways defined by a floor and side walls comprising, support means, said support means being a plurality of anchor posts each having one end secured to the floor along the passageway, the other end of the anchor post being wedge-shaped so as to give the appearance of a dove-tail tongue in outline, and a resilient cover plate having a channel portion with converging sidewalls which rigidly clip over the wedge-shaped ends of said anchor posts to cover said passageways.

References Cited

UNITED STATES PATENTS

| | | | |
|---|---|---|---|
| 2,752,580 | 6/1956 | Shewmaker | 339—17 |
| 2,916,721 | 12/1959 | Adams | 317—118 |
| 3,002,177 | 9/1961 | Bundy | 174—59 |
| 3,225,264 | 12/1965 | Weiss | 317—119 |

OTHER REFERENCES

Electrical Manufacturing (Hughes), April 1956, p. 184.

LEWIS H. MYERS, *Primary Examiner.*

J. G. COBB, W. C. GARVERT, J. R. SCOTT,
*Assistant Examiners.*